(12) United States Patent
Kangarlou Haghighi et al.

(10) Patent No.: US 9,398,117 B2
(45) Date of Patent: Jul. 19, 2016

(54) PROTOCOL DATA UNIT INTERFACE

(71) Applicant: NetApp, Inc., Sunnyvale, CA (US)

(72) Inventors: Ardalan Kangarlou Haghighi, Raleigh, NC (US); John David Strunk, Apex, NC (US)

(73) Assignee: NetApp, Inc., Sunnyvale, CA (US)

( * ) Notice: Subject to any disclaimer, the term of this patent is extended or adjusted under 35 U.S.C. 154(b) by 103 days.

(21) Appl. No.: 14/061,964

(22) Filed: Oct. 24, 2013

(65) Prior Publication Data

US 2015/0085878 A1    Mar. 26, 2015

Related U.S. Application Data

(60) Provisional application No. 61/883,010, filed on Sep. 26, 2013.

(51) Int. Cl.
| | | |
|---|---|---|
| *H04L 12/28* | (2006.01) | |
| *H04J 3/16* | (2006.01) | |
| *G06F 13/00* | (2006.01) | |
| *H04L 29/06* | (2006.01) | |
| *H04L 29/08* | (2006.01) | |
| *H04L 12/861* | (2013.01) | |
| *H04L 12/24* | (2006.01) | |

(52) U.S. Cl.
CPC ............ *H04L 69/18* (2013.01); *H04L 41/0226* (2013.01); *H04L 49/9057* (2013.01); *H04L 69/321* (2013.01); *H04L 69/322* (2013.01)

(58) Field of Classification Search
CPC ................. H04L 12/2405; H04L 2012/5652; H04L 41/0226; H04L 69/08; H04L 69/18; H04L 69/322; H04Q 11/0478
See application file for complete search history.

(56) References Cited

U.S. PATENT DOCUMENTS

| | | | | |
|---|---|---|---|---|
| 5,917,828 A | * | 6/1999 | Thompson | H04Q 11/0478 370/392 |
| 6,052,387 A | * | 4/2000 | Chow | H04L 49/90 370/471 |
| 7,127,534 B2 | * | 10/2006 | Jackson | G06F 13/385 710/27 |
| 7,142,540 B2 | | 11/2006 | Hendel et al. | |
| 7,289,441 B1 | * | 10/2007 | Barach | H04L 12/5695 370/230 |
| 7,630,402 B2 | * | 12/2009 | Un | H04L 1/0043 370/363 |
| 7,639,712 B2 | * | 12/2009 | Un | H04L 1/0041 370/230 |
| 7,710,968 B2 | * | 5/2010 | Cornett | H04L 49/90 370/392 |
| 7,773,630 B2 | * | 8/2010 | Huang | H04L 47/10 370/474 |
| 7,844,753 B2 | * | 11/2010 | Cornett | H04L 69/16 370/389 |
| 7,907,608 B2 | | 3/2011 | Liu et al. | |
| 8,312,243 B2 | * | 11/2012 | Balan | H04L 49/9042 710/52 |
| 8,798,085 B2 | * | 8/2014 | Wunderlich | H04L 69/16 370/389 |

(Continued)

FOREIGN PATENT DOCUMENTS

WO    2006031496    3/2006

*Primary Examiner* — Alpus H Hsu (57) ABSTRACT

An interface can be designed that efficiently constructs descriptors for streams of protocol data units (PDUs) and provides coherent views of the PDUs and the PDU stream for a requesting application regardless of location within a buffer pool for PDUs. The interface creates a descriptor for each PDU written into the buffer pool and links the descriptors in accordance with the appropriate order of the corresponding PDUs. The interface can create PDU descriptors hierarchically. For instance, a PDU descriptor for a PDU of a layer N protocol can refer to one or more PDU descriptors of a layer N−1 protocol.

13 Claims, 5 Drawing Sheets

(56) References Cited

U.S. PATENT DOCUMENTS

| | | | | |
|---|---|---|---|---|
| 8,811,411 B2* | 8/2014 | Wu | ........................ | H04L 49/90 370/395.1 |
| 9,148,819 B2* | 9/2015 | Lynch | ................... | H04L 49/901 |
| 2009/0238124 A1* | 9/2009 | Pragada | ................... | H04L 49/90 370/329 |
| 2009/0296683 A1* | 12/2009 | Raju | .................... | H04L 69/324 370/349 |
| 2009/0300328 A1* | 12/2009 | Raju | .................. | H04W 28/065 712/204 |
| 2009/0323585 A1* | 12/2009 | Raju | ....................... | H04L 49/90 370/328 |
| 2010/0175073 A1* | 7/2010 | Hu | .......................... | H04L 69/32 719/326 |
| 2011/0090805 A1* | 4/2011 | Chen | ..................... | H04L 47/525 370/252 |
| 2013/0268689 A1* | 10/2013 | Leucht-Roth | ......... | H04L 1/0079 709/232 |
| 2014/0348101 A1* | 11/2014 | Wang | ................. | H04L 49/9047 370/329 |

\* cited by examiner

PROTOCOL DATA UNIT INTERFACE

BACKGROUND

Embodiments of the inventive subject matter generally relate to the field of data processing, and, more particularly, to protocol data unit assembly.

Communications between computers over a network are facilitated by components that include a combination of software, firmware, and/or hardware, commonly referred to as a "network stack" or "protocol stack". The components of the network stack are "layered" and designed to facilitate the communications according to the function of each particular layer. For example, the components at the network layer determine how to send data from one computer to another over the network. The components at the application layer, however, may only represent data and commands that are specific to an actual software application, such as a web browser or e-mail application. Thus, the network layer may add (when sending) or remove (when receiving) data specific to communicating the data from one computer to another. The components at the application layer, however, may have no knowledge of the data used by the network layer. Each layer operates on a unit of data that conforms to a protocol implemented at the given layer. Although the protocol at each layer may refer to the data unit by a particular moniker (e.g., packet, frame, message, etc.), this unit of data is generally referred to as a protocol data unit (PDU).

For example, consider a network stack that consists of an application layer, a network layer, and a physical layer. Two computers are connected via a network and both implement compatible network stacks. A file transfer application on an originating computer of the two computers can create an "application message". The application message is designed to be received by a compatible file transfer application on the other computer (the receiving computer). The application message might indicate that the file transfer application on the originating computer is attempting to transfer a file to the file transfer application on the receiving computer. The application message might also include the data associated with the file being transferred. The application message can consist of a header, which typically contains data about the message (such as a command), and a payload, which contains the actual data associated with the message (such as the file data).

Once the application message is created, the file transfer application passes the application message to the network layer. Components at the network layer communicate using packets. The format of a packet may be different than that of an application message, and thus the networking layer components might convert the application message into one or more packets. For example, packets may be a fixed size that is smaller than the application message. Thus, the networking layer components might break the application message into multiple packets. Similarly, the packets may be a fixed size greater than the size of the application message. Thus, the networking layer components might put multiple application messages into a single message. Further, the networking layer components might add additional data to the packet, such as network addresses associated with the two computers. Similar to an application message, a packet comprises a header and a payload. The header contains data about the packet, while the payload can contain the application message (including the application message header) or a subset thereof.

The originating computer's network layer components pass the packet(s) to the physical layer of the originating computer. The physical layer components format packets from the network layer into frames in accordance with the physical layer protocol and transmit the frames with the physical characteristics as defined by the physical layer protocol. The physical layer components of a computer can include a network interface card and a network interface card driver. The network interface card transmits the frames as signals to a network interface card on the receiving computer. The receiving computer's physical layer components process received signals into frames, extract payloads from the frame, and supply the payloads to the receiving computer's network layer components. The receiving computer's network layer components process the payloads from the physical layer as network layer packets, decapsulate payloads from the network layer packets, and provide the payloads to the application layer at the receiving computer. The receiving computer's application layer components then reassemble the application message from the payloads provided from the network layer.

SUMMARY

When protocol data units are received by a computer, the protocol data units are stored in buffers. Protocol data units for multiple data streams may be received over a given time period, resulting in protocol data units associated with the same data stream being stored in noncontiguous buffers. Data structures that reference the various protocol data units can be created to provide a coherent view of protocol data units that are related, even if the protocol data units are stored in noncontiguous buffers. An interface creates a descriptor data structure for each protocol data unit and links the descriptor data structures for each related protocol data unit in the proper order. When protocols are layered on top of each other, the interface can create hierarchical levels of descriptor data structures, in which the higher-level descriptor data structures reference the lower-level descriptor data structures. Thus, applications associated with the protocol data units can access the protocol data units without the protocol data units being copied into contiguous locations of memory.

BRIEF DESCRIPTION OF THE DRAWINGS

The embodiments may be better understood, and numerous objects, features, and advantages made apparent to those skilled in the art by referencing the accompanying drawings.

DESCRIPTION OF EMBODIMENT(S)

The description that follows includes example systems, methods, techniques, instruction sequences and computer program products that embody techniques of the inventive subject matter. However, it is understood that the described embodiments may be practiced without these specific details. For instance, although examples refer to a subset of possible protocol data units, the inventive subject matter can apply to other protocol data units not explicitly discussed. In other instances, well-known instruction instances, protocols, structures and techniques have not been shown in detail in order not to obfuscate the description. For example, the descriptions of network stacks are simplified. While network stacks can comprise many layers, the network stacks described herein generally only refer to two or three layers. Further, the layers described are general examples, as the specific layers of any particular implementation can vary.

TERMINOLOGY

The descriptions herein refer to protocol data units (PDUs). A PDU is a unit of data as defined by a particular protocol. The moniker for PDU can vary with the governing protocol. For example, the Ethernet protocol refers to PDUs as frames; the TCP/IP protocols refer to PDUs as packets; and the Network File System protocol refers to PDUs as messages. Regardless of the various monikers, a PDU generally includes a header and a payload. For some protocols, the PDU will also include a trailer.

The descriptions herein also refer to PDU descriptors. A descriptor is a data structure that indicates information about data. A PDU descriptor indicates information about a PDU. For example, a PDU descriptor can indicate a location of a PDU and control information from the PDU (e.g., sequence number, port number, PDU size, etc.).

Introduction

After a receiving computer's physical layer components process a received signal and extract payloads from the physical layer PDUs, those payloads are stored into memory locations accessible by components of at least the next highest layer protocol. The extracted payloads may comprise PDUs of at least the next highest layer protocol. The aggregate of the memory locations is referred to herein as a "buffer pool," and each memory location can be considered an individual buffer. The physical layer components may be receiving data streams for multiple applications over the same time period. The extracted payloads may be stored in the buffer pool in the order that they are received, thus potentially resulting in related packets being stored in noncontiguous memory locations within the buffer pool. Further, the extracted payloads may be of a different size than the buffers, resulting in gaps created by unused space within the buffer. The extracted payloads may also include header data. Thus, even if the extracted payloads are written into contiguous memory locations and fill the entire buffer, the header data may result in gaps between the actual data used by applications. Because many applications expect the data to be stored contiguously, the payloads and/or PDUs are copied to contiguous memory locations prior to use by the associated application. This copying introduces computing overhead, thus reducing the potential performance of applications that analyze the payloads and/or PDUs.

In addition, the typical layout of computer memory (or, more specifically, virtual memory) also results in the copying of data, regardless of whether data for an application is split between multiple PDUs. Computer memory is typically divided into "kernel space" and "user space". Kernel space is restricted such that only a subset of the software running on a computer can access kernel space. Generally, applications that exist as part of the network stack's application layer can only access user space, while the components of lower level layers of the network stack, such as the network layer and transport layer, can access kernel space. Thus, to provide an application access to an application message, the data representing the application message is copied from the kernel space to the user space, even if it is not split among multiple PDUs, received out of order, etc.

While it may be possible for an application to access kernel space data through mechanisms such as system calls, those mechanisms may still result in significant overhead. The associated overhead, whether from copying data in memory or using mechanisms that allow access to kernel data, can reduce the performance of applications in the application layer.

For example, "deep packet inspection" describes techniques for analyzing the payload of packets transmitted over a network. Unlike firewall functionality, which typically analyzes only information in the header of a packet, deep packet inspection may scan some or the entirety of the actual payload in addition to analyzing the header information. Thus, while firewall functionality can be used to determine whether a packet should pass through the firewall based on a limited subset of data, deep packet inspection can analyze the entirety of the packet to search for restricted content (such as viruses), detect a network intrusion event, etc. The additional processing performed, and thus overhead created, in deep packet inspection can limit the rate at which packets can be analyzed by a deep packet inspection application. The limited rate of analysis thus may result in some packets not being analyzed or result in delayed processing of the packets, thus decreasing security.

Even if the overhead associated with the processing of PDUs by the network stack does not limit the performance of an application in the application layer, reducing overhead can benefit a computer in general. For example, copying data from one memory location to another, as done when copying data from kernel space to user space, uses power, which can reduce battery life of a portable computer. Relatedly, copying data can further consume processor time, either consuming more power or delaying the completion of other tasks.

However, an interface can be designed that efficiently constructs descriptors for streams of PDUs and provides coherent views of the PDUs for a requesting application without copying PDUs from the buffer pool. The interface ("PDU stream interface") creates a descriptor for each PDU written into the buffer pool and links the descriptors in accordance with the appropriate order of the corresponding PDUs. The PDU stream interface can create PDU descriptors hierarchically. For instance, a PDU descriptor for a PDU of a layer N protocol can refer to one or more PDU descriptors of a layer N−1 protocol. The PDU stream interface provides an abstracted, consistent interface to the data (i.e., PDUs and/or payloads of PDUs) while allowing an associated application to bypass the operating system and without copying the data out of the buffer pool.

PDU Stream Interface Example Illustrations

Figure 1:
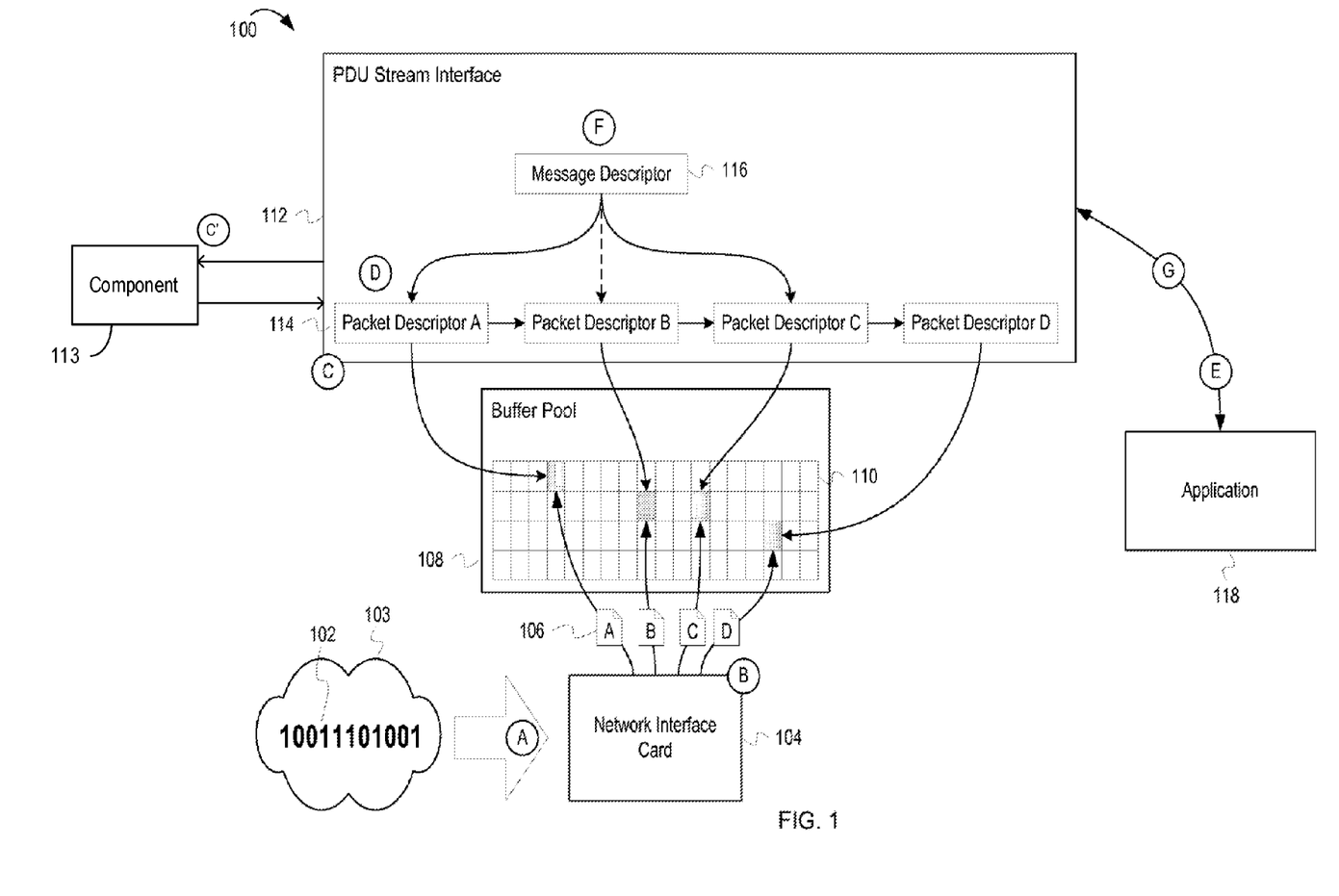
FIG. 1 depicts an example PDU stream interface that provides access to PDUs and/or payloads of PDUs without copying from the buffer pool.

FIG. 1 depicts an example PDU stream interface that provides access to PDUs and/or payloads of PDUs without copying from the buffer pool. FIG. 1 depicts a system 100 including a network interface card (NIC) 104, a buffer pool 108, and a PDU stream interface 112. The buffer pool 108 comprises a set of buffers 110. Each buffer 110 of the buffer pool 108 is a location in memory of the system 100. The NIC 104 obtains the buffers 110 of the buffer pool 108 from the system 100. For example, the NIC 104 might request ten megabytes of memory from a memory subsystem (not depicted). The memory subsystem might then provide a starting address for the buffer pool 108. Each buffer 110 then begins at an address associated with increments that conform to the particular NIC 104 implementation.

FIG. 1 also depicts an application 118 which is communicatively coupled with the PDU stream interface 112. For this illustration, FIG. 1 presumes a lower layer protocol that refers to PDUs as packets and a higher layer protocol that refers to PDUs as messages. Thus, FIG. 1 depicts a message descriptor 116 and multiple packet descriptors 114.

At stage A, the NIC 104 receives data stream 102 over a network 103. Generally, the NIC 104 is connected to the network 103 using one or more interconnects, such as physical cables, wireless signals, etc. For example, the NIC 104 can communicate with other devices on the network 103 over an Ethernet cable, a Fibre Channel® cable, a Wi-Fi® connection, etc. The data stream 102 can be sent according to a specific protocol that defines how the data stream 102 is encoded (including error correction data), how multiple data streams are handled, etc.

At stage B, the NIC 104 processes the received data stream 102 into packets 106 and writes the packets into the buffer pool 108. A packet may be a defined length, such as sixty-four bytes. Thus, when the NIC 104 receives the defined number of bits (sixty-four bytes worth in the previous example), the NIC 104 has received a single packet.

To write one of the packets 106 to the buffer pool 108, the NIC 104 can put the address of the particular buffer on a memory bus (not depicted) along with, or followed by the data representing the particular packet. The process is repeated for the additional packets 106. While not necessarily received or written in order, the packets 106 do have a particular order. For example, each packet may include a packet sequence number that indicates in what sequence the packets 106 are to be processed. Thus, for example, if an application message is split among multiple packets, it is possible to determine which order the packets associated with the application message should be arranged in (thus allowing the recreation of the application message).

The actual data written to the buffer pool 108 can vary between implementations. In some implementations, the NIC 104 may remove some information from the packets 106 prior to writing the packets 106 to the buffer pool 108. For example, a portion of each packet received by the NIC 104 may only be needed by the NIC 104, and thus may be removed from each packet prior to writing the packets 106 to the buffer pool 108. Other data can be removed from the packets 106 prior to writing the packets 106 to the buffer pool 108 by other components associated with the NIC 104 and network stack. In some implementations, the packets 106 are written to the buffer pool 108 without any data removed from the packets 106.

The actual component responsible for writing the packets 106 to the buffer pool 108 may be a component associated with the NIC 104, as opposed to the NIC 104 itself. For example, while firmware on the NIC 104 may write the packets 106 to the buffer pool 108, a software driver existing as part of an operating system may also write the packets 106 to the buffer pool 108. Further, any component that can communicate with the NIC 104 can write the packets 106 to the buffer pool.

At stage C, the PDU stream interface 112 receives an indication that the packets 106 have been written to the buffer pool 108. In some implementations, the PDU stream interface 112 polls a component 113 responsible for managing the buffer pool 108 to determine that the packets 106 have been written to the buffer pool 108. The component 113 responsible for managing the buffer pool 108 can be the NIC 104, the PDU stream interface 112, another component within the system 100, or a combination thereof. The component 113 responsible for managing the buffer pool 108 may have access to indications of which buffers 110 of the buffer pool 108 are empty (or "invalid"), such as a "free list". When the NIC 104 writes one of the packets 106 into the buffer pool 108, the buffer 110 that the packet is written to can be removed from the "free list", thus indicating that the buffer 110 contains a valid packet. The PDU stream interface 112 can determine if the "free list" (or any corresponding structure that indicates which buffers 110 have valid packets) has changed since the previous poll to determine that the packets 106 have been written into the buffer pool 108. For example, at step C' the PDU stream interface 112 can poll the component 113 responsible for managing the buffer pool 108, and the responsible component 113 can return a value indicating whether any data was written to the buffer pool 108 since the previous poll. The PDU stream interface 112 may also have access to the "free list", thus being able to determine if the "free list" has changed itself. The implementation of the component(s) 113 that manages the buffer pool 108 can vary, and the implementations of the NIC 104, PDU stream interface 112, and other components of the system can vary accordingly.

In some implementations, the PDU stream interface 112 is notified when one or more packets are written to the buffer pool 108. For example, the PDU stream interface 112 can register an event or interrupt handler with the system 100. When the NIC 104 writes one of the packets 106 into the buffer pool 108, the NIC 104 (or memory subsystem, associated component, etc.) notifies the PDU stream interface 112. Thus, the PDU stream interface 112 does not poll the buffer pool 108 for information, but receives notifications of changes to the buffer pool 108. Notification(s) can include the address(es) associated with the buffer(s) 110 that have been written to.

At stage D, the PDU stream interface 112 creates packet descriptors 114 for the packets 106 written to the buffer pool 108. In FIG. 1, the packets 106 include a packet A, a packet B, a packet C, and a packet D. Accordingly, the packet descriptors 114 include a packet descriptor A, a packet descriptor B, a packet descriptor C, and a packet descriptor D. The packet descriptor A includes a reference to the buffer 110 that contains packet A; the packet descriptor B includes a reference to the buffer 110 that contains packet B; the packet descriptor C includes a reference to the buffer 110 that contains packet C; and the packet descriptor D includes a reference to the buffer 110 that contains packet D. Each packet descriptor also includes a reference to the packet descriptor associated with the next packet in the sequence of packets. For example, when the PDU stream interface 112 receives an indication that packet A has been written to the buffer pool 108, the PDU stream interface 112 creates packet descriptor A and includes a link to the particular buffer associated with packet A. When the PDU stream interface 112 receives an indication that packet B has been written to the buffer pool 108, the PDU stream interface 112 creates packet descriptor B and includes a reference to the particular buffer associated with the packet B. The reference to the particular buffer included in a packet descriptor can be the memory address of the particular buffer or other value that allows the PDU stream interface 112 to access the referenced packet. Further, the PDU stream interface 112 determines that packet A precedes packet B, and thus stores a reference to packet descriptor B in packet descriptor A. By using the references to sequentially link the packet descriptors 114, the PDU stream interface 112 can traverse the packets 106 in sequence regardless of where the packets actually reside.

Other information about the packets can be included in the packet descriptors 114 as well. For example, information from the headers of the packets 106 can be stored in the associated packet descriptors 114. Similarly, the PDU stream interface 112 can include data from the packet payloads. Including data from the packets 106 in the packet descriptors 114 can provide the PDU stream interface 112 with easier (and potentially quicker) access to commonly accessed data, as well as allowing the PDU stream interface 112 to store the data in a format more conducive to use by the PDU stream interface 112. The data included in the packet descriptors 114 can include packet identifiers (such as the packet sequence number), port identifiers, channel identifiers, source address, fragmenting information, packet length, packet header length, etc.

Not all of the packets 106 are necessarily associated with applications that use the PDU stream interface 112. In other words, in some implementations, the PDU stream interface 112 filters PDUs for descriptor construction. The PDU stream interface can filter based on various control information from PDU headers (e.g., port number, fragment identifier, etc.). In this illustration, the PDU stream interface could create packet descriptors 114 for only a subset of the packets 106. Thus, in some implementations, the PDU stream interface 112 analyzes each packet to determine whether a packet descriptor should be created for the particular packet before creating the packet descriptor. In some implementations, the PDU stream interface 112 creates a packet descriptor for a particular packet first and then analyzes the data associated with the packet to determine whether the packet descriptor should be deleted or otherwise disposed of. If the PDU stream interface 112 determines that the particular packet should not have a packet descriptor, the packet descriptor can be deleted or otherwise disposed of.

Various techniques can be used for filtering by the PDU stream interface 112. For example, network communications with the application 118 may be associated with a particular network port or set of ports. The application 118 can then indicate to the PDU stream interface 112 which ports are associated with the application 118. The PDU stream interface 112 can then determine which port(s) the packets 106 are associated with, and only create/maintain packet descriptors 114 for the packets 106 associated with the port(s) specified by the application 118. The data indicating which port the packets 106 are associated with can be included in the respective packet descriptor. The PDU stream interface 112 can use any of the data available to determine which of the packets 106 the PDU stream interface 112 should create packet descriptors 114 for or which packet descriptors 114 should be filtered.

At stage E, the application 118 requests data using an API associated with the PDU stream interface 112. The API, and thus the PDU stream interface 112, can be implemented to allow varying levels of data abstraction. For example, in some implementations, the PDU stream interface 112 can be implemented such that the application 118 can specify individual bytes, or a range of bytes, within one or more of the packets 106. Thus, the PDU stream interface 112 can allow access to the packets directly (i.e., a low level view of the packets). In some implementations, the PDU stream interface 112 can abstract the data contained in the packets 106 such that the PDU stream interface 112 provides access to the packet data based on associated application messages. For example, instead of specifying which bytes of data the application 118 wants, the application 118 can specify that data relating to a particular application message is wanted. In some implementations, the API can be implemented to allow both access to the packets as well as abstracting the packets 106 to represent application messages (or other constructs). Further, the PDU stream interface 112 can further abstract the data contained in the packets 106. For example, the payloads of a set of application messages derived from the packets 106 can contain data for a higher level application message. The PDU stream interface 112 can thus continue creating higher level PDU descriptors as appropriate.

When the application 118 specifies the particular bytes of data the application 118 wants, the packet descriptors 114 are typically sufficient for accessing the data. In other words, the PDU stream interface 112 can access the individual bytes of the packets 106 using the packet descriptors 114 because each packet descriptor includes a reference to the data representing the associated packet. Thus, a low level view of the packet data can be sufficient for use by some applications.

The application 118 can specify the requested data at a higher level of abstraction in a variety of ways. For example, the application 118 might request data associated with the "next" application message in a stream of application messages or a particular application message. The application 118 might request data associated with a specific application message, indicated by a particular identification value associated with the application message. The application 118 might request application messages based on other data associated with an application message, such as requesting all application messages associated with a specific command or specific stream of application messages.

The API can be implemented in a variety of ways. For example, the API can be implemented using system calls. In an implementation utilizing system calls, the application 118 makes a system call indicating the requested data, which is passed to the PDU stream interface 112. However, as discussed above, implementations that rely on system calls can result in more overhead than bypassing the operating system. Thus, the API can be implemented without using system calls, facilitated by the fact that applications that can write to restricted memory (such as the memory designated as kernel space) can read and write to non-restricted memory. For example, a specific area of non-restricted memory (such as the memory designated as user space) can be indicated for communications with the PDU stream interface 112. The application 118 can write requests for the PDU stream interface 112 into the memory locations indicated for communications with the PDU stream interface 112. The PDU stream interface 112 can then read the requests from the memory locations.

Further, the application 118 can be an application that can communicate with the PDU stream interface 112 directly. For example, both the PDU stream interface 112 and the application 118 can operate as kernel processes within an operating system, thus allowing direct communication between the processes. Further, other techniques for communication may be utilized that do not involve writing to memory.

At stage F, the PDU stream interface 112 creates the message descriptor 116 in response to receiving a request for data associated with an application message from the application 118. The message descriptor 116 represents packets at a higher level of abstraction. For example, as discussed above, the API can allow the application 118 to request data for particular application messages instead of specifying specific bytes of packet data. The PDU stream interface 112 can create the message descriptor 116 to identify which packet(s) correspond to a particular application message.

To create the message descriptor 116, the PDU stream interface 112 searches the data associated with the packets 106 for indications of an application message. The PDU stream interface 112 can search the data associated with the packets 106 by iterating through the packet descriptors 114. For each packet descriptor of the packet descriptors 114, the PDU stream interface 112 reads the data from the particular buffer referenced by the particular packet descriptor. The PDU stream interface 112 then searches the packets for an indication of an application message, including searching the packet payload.

An application message indication can vary between implementations. Generally, however, an application message indication will be a particular set of bits that are defined as the start of an application message. For example, a definition of an application message may specify that an application message begins with a specific series of symbols that are unlikely to occur in other portions of the application message. Thus, when the PDU stream interface 112 finds the bit representation of the specified series of symbols, the PDU stream interface 112 determines that an application message begins there. Other techniques to represent the start of an application message can be used, such as encoding the application message data using a tree or another structure.

Once the PDU stream interface 112 locates the beginning of an application message, the PDU stream interface 112 can store the data specifying the location of the application message in the message descriptor 116. For example, the message descriptor 116 can include a reference to the packet descriptor associated with the packet that includes the beginning of the application message. The message descriptor 116 can also include the particular byte of the packet or an offset associated with the beginning of the application message. The PDU stream interface 112 can also store additional data related to the application message in the message descriptor 116, including data contained within the application message header, such as a command associated with the application message and metadata about the application message itself.

The PDU stream interface 112 further determines the location of the end of the application message. The technique used to specify the end of the application message can vary between implementations. For example, the end of the application message can be specified by a particular sequence of bits (similar to the beginning of the application message), may implicitly be specified by the beginning of another application message, be specified by indicating the length of the application message, etc.

Determining the location of the end of the application message can vary between implementations as well. For example, the PDU stream interface 112 can continue searching the data associated with the packet containing the beginning of the application message. If a sequence of bits indicating the end of the application message or the beginning of another application message is found, the PDU stream interface 112 has determined the end of the application message. If no indication of the end of the application message is found, the PDU stream interface 112 can continue to the next packet by using the reference to the next packet descriptor to traverse the chain of packet descriptors 114, as described above. The PDU stream interface 112 can continue searching the packet data, traversing the chain of packet descriptors 114 until the end of the application message is found.

Additionally, application messages can be defined to be a fixed length or can specify their length. For example, the application message header may indicate the length of the application message or any variable-sized portions of the application message, thus allowing the length of the application message to be computed. If the PDU stream interface 112 can determine the length of the application message, the PDU stream interface 112 can "skip" to the packet descriptor that references the final packet containing the application message instead of searching the packet data. In other words, because the PDU stream interface 112 knows the length of each packet and the length of the application message, the PDU stream interface 112 can determine which packet descriptor is associated with the end of the application message. Once the particular packet descriptor is determined, the PDU stream interface 112 can traverse the packet descriptors 114 until reaching the packet descriptor associated with the end of the application message without searching the packet data. For example, assume each packet contains eight kilobytes of payload and the PDU stream interface 112 determines that an application message is 64 kilobytes in length. If the application message starts at the 4096 byte of the payload portion of a first packet, the last byte of the application message is the 4095 byte of the payload portion of the eighth packet after the initial packet. The PDU stream interface 112 can also take into account the header size of the packets 106 and whether the packets 106 are fixed or variable length.

Once the PDU stream interface 112 determines the location of the end of the application message, the PDU stream interface 112 can store a reference to the packet descriptor associated with the end of the application message in the message descriptor 116, along with the specific byte associated with the end of the application message. The PDU stream interface 112 can also store references to any intermediate packet descriptors that contain data related to the application message. However, because the packet descriptors 114 are linked to each other, the PDU stream interface 112 can traverse the references contained in the packet descriptors 114 until reaching the packet descriptor that is indicated as including the end of the application message. Thus, message descriptor 116 can specify the set of packet descriptors associated with the application message by only specifying the first and last packet descriptor. However, storing references to intermediate packet descriptors can be used to facilitate random access to the data within the application message. For example, the API may allow the application 118 to request a subset of the data associated with the application message. Thus, instead of traversing each packet descriptor associated with the application message until reaching the specified data, the PDU stream interface 112 can utilize a reference to an intermediate packet descriptor to go directly to the data requested.

Consider the example depicted in FIG. 1. The PDU stream interface 112 has received a request for a particular application message. The PDU stream interface 112 reads the packet referenced by packet descriptor A. The PDU stream interface 112 determines that the application message begins in packet A using one of the techniques described herein (or other technique for determining where an application message begins). The PDU stream interface 112 creates the message descriptor 116 and stores a reference to packet descriptor A therein. The PDU stream interface 112 can also store an indication of which byte of packet A (or the payload of packet A) the application message begins at.

The PDU stream interface 112 further determines that the application message comprises two additional packets (or one additional packet and part of a second additional packet), based on data such as a length value included in the application message or a predetermined length value. Thus, the PDU stream interface 112 traverses to the next packet descriptor in the chain of packet descriptors 114 by resolving the reference stored in packet descriptor A. The reference stored in packet descriptor A refers to packet descriptor B. The PDU stream interface 112 can optionally store a reference to packet descriptor B in the message descriptor 116. The PDU stream interface 112 traverses to the next packet descriptor in the chain of packet descriptors 114 by resolving the reference stored in packet descriptor B. The reference stored in packet descriptor B refers to packet descriptor C. Because the PDU stream interface 112 determined that the application message ends two packets after packet A, the PDU stream interface 112 stores a reference to packet descriptor C in the message descriptor 116 as the packet descriptor that refers to the final packet (packet C) that comprises part of the application message. The PDU stream interface 112 can also store an indication of which byte of packet C (or the payload of packet C) the application message ends at. Thus, the PDU stream interface 112 has delineated the location of the data associated with the application message within the packets 106.

For application messages that do not span multiple packets, the PDU stream interface 112 can store a reference to the sole packet as the beginning and ending packet, along with an indication of which bytes of the packet the application message begins and ends at. Thus, the PDU stream interface 112 can include multiple message descriptors that reference the same packet.

The examples above describe the message descriptor 116 as being created in response to receiving a request from the application 118, or "on demand". However, the PDU stream interface 112 can create message descriptors for each application message that is represented by the packets 106 even without receiving a request from the application 118.

At stage G, the PDU stream interface 112 returns the requested data to the application 118. The technique used to return the requested data to the application 118 can vary between implementations. For example, in some implementations, the requested data can be returned by writing it into a specified area of memory. The area of memory can be specified by the PDU stream interface 112, the application 118, or another component. In some implementations, the requested data can be returned by using other communication techniques, such as inter-process communications.

In some implementations, the requested data is not returned directly, but a reference to the requested data is returned. For example, if the application 118 can access the restricted memory in which the buffers 110 are stored, the PDU stream interface 112 can return one or more message descriptors and/or one or more packet descriptors 114. The application 118 can utilize the message descriptors and/or packet descriptors 114 to access the particular buffers referenced therein. Further, the PDU stream interface 112 may return references to the actual message descriptors and packet descriptors 114. Thus, the application 118 can access the data within the message descriptors and packet descriptors 114 without duplicating the data of the message descriptors or packet descriptors 114.

It should be noted that while in some implementations packet data might be copied in memory, the copying would be done when requested by the application 118. Typically, before an application can determine data such as a command associated with an application message, the associated packets are copied within memory. Thus, applications cannot determine the relevance of the particular application message until the data is copied. However, utilizing a PDU stream interface allows for the determination of the relevance of the particular application message prior to any copying, thus permitting a reduction in the amount of data that is copied.

Figure 2:
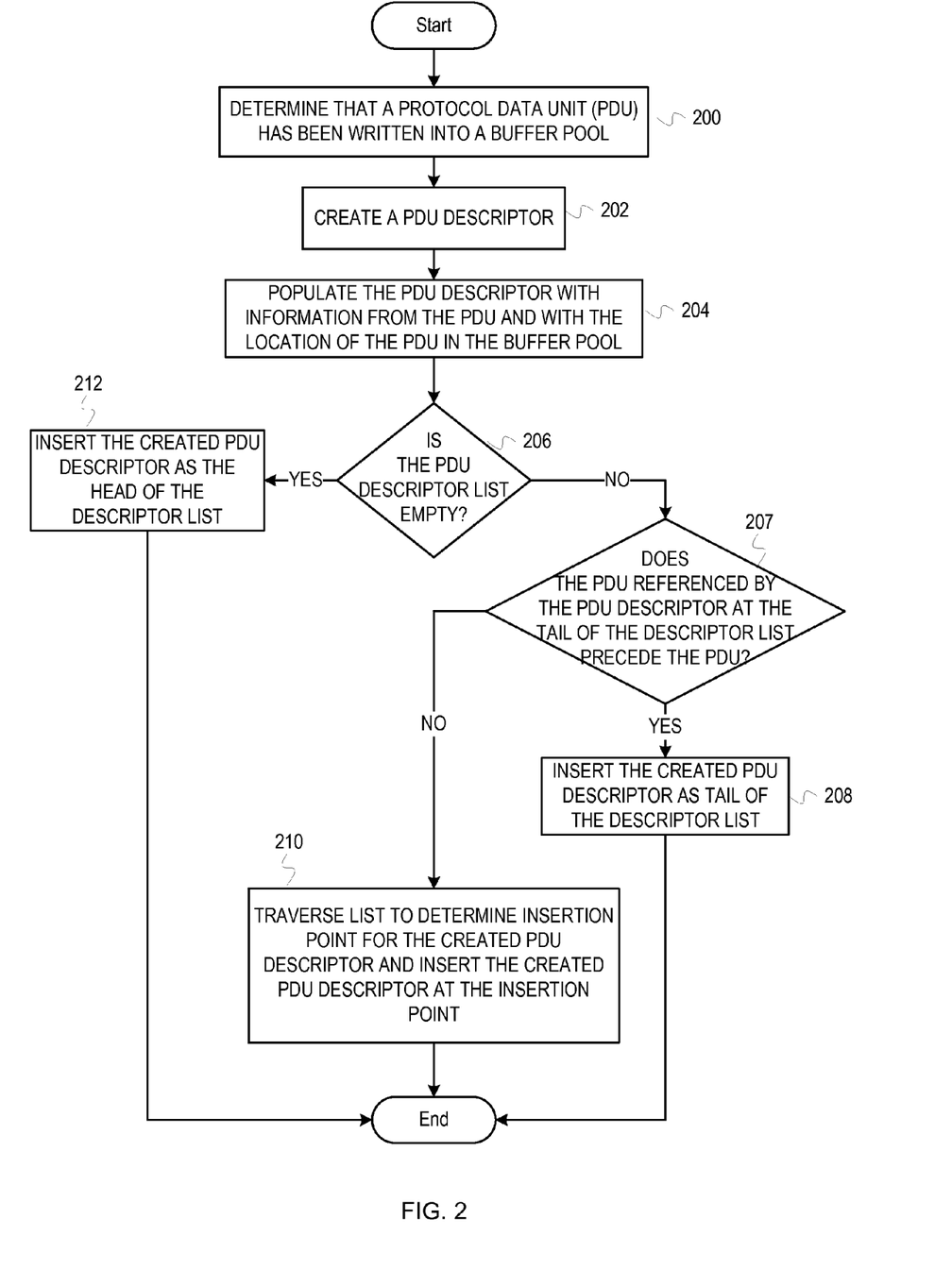
FIG. 2 depicts a flowchart of example operations for constructing a base layer protocol data unit descriptor list.

FIG. 2 depicts a flowchart of example operations for constructing a base layer protocol data unit descriptor list. The descriptor list provides access to the PDUs written into a buffer pool by receiving hardware components (e.g., network interface card). Although this example refers to a list, implementations can utilize different types of structures that impose or represent order. The operations depicted in FIG. 2 and described below can be performed by the PDU stream interface 112 depicted in FIG. 1 but are not limited to the embodiments described above.

At block 200, it is determined that a PDU has been written into a buffer pool. As mentioned earlier, implementations can vary for detecting that a PDU is written into a buffer pool. The implementations can be poll based. For example, an executing instance of program code (e.g., a process or agent) periodically reads a memory location for a flag indicating completion of a write operation to the buffer pool. As another example, the process or agent periodically reads a memory location for a memory address corresponding to a buffer in the buffer pool. The process or agent may analyze metadata about the buffer pool to determine whether there is an indication that the first packet data has been written to the buffer pool. For example, the process or agent can read and store a list specifying which buffers in the buffer pool are free (hereinafter referred to as a "free list"). The PDU stream interface can then read the free list at a later point and compare the newly read free list with the stored free list to determine whether any previously free buffers are now being used. An implementation can also be interrupt driven. For example, a NIC driver can generate an interrupt when a PDU is written into the buffer pool with buffer location in the interrupt message. After it is determined that the PDU has been written into a buffer pool, control then flows to block 202.

At block 202, a PDU descriptor is created. The PDU descriptor can take any one of a variety forms that accommodate the information to be extracted from the PDUs, such as an array, a struct, a class/object, etc. The information to be extracted can at least include any one of size of PDU header, offset to payload, control information from a PDU header, and data from the payload. After the PDU descriptor is created, control then flows to block 204.

At block 204, the created PDU descriptor is populated with information from the PDU and with the location of the PDU in the buffer pool. For instance, program code implementing a PDU stream interface writes a buffer address into the PDU descriptor, a packet sequence number, offset to payload, and other metadata relating to the PDU. After the created PDU descriptor is populated with information from the PDU and with the location of the PDU in the buffer pool, control then flows to block 206.

At block 206, it is determined whether the PDU descriptor list is empty. If other PDU descriptors have already been created, control then flows to block 207. If the PDU descriptor list is empty, control then flows to block 212.

At block 212, the created PDU descriptor is inserted as the head of the PDU descriptor list. After the created PDU descriptor is inserted as the head of the PDU descriptor list, the process ends.

If the PDU descriptor list was not empty at block 206, then it is determined at block 207 whether the PDU referenced by the PDU descriptor at the tail of the descriptor list precedes the PDU corresponding to the newly created PDU descriptor. In some cases, a protocol data unit may be received out of order. Thus, the PDU stream interface constructs the PDU descriptor list in a manner that conforms to sequence of PDUs as sent or intended to be received instead of as actually received. For example, the PDU stream interface can compare sequence numbers or timestamps related to the particular PDU in order to establish the proper sequence of PDUs. If the PDU referenced by the tail PDU descriptor does not precede the PDU of the newly created PDU descriptor, control then flows to block 210. Otherwise, control then flows to block 208.

At block 208, the created PDU descriptor is inserted into the PDU descriptor list as the tail. The PDU descriptor can be inserted into the PDU list as the tail by writing a reference to the PDU descriptor into the tail PDU descriptor. Once a reference to the PDU descriptor is written into the tail PDU descriptor, the PDU descriptor becomes the new tail. After the PDU descriptor is inserted into the PDU descriptor list as the tail, the process ends.

At block 210, the PDU descriptor list is traversed to determine an insertion point for the created PDU descriptor and the created PDU descriptor is inserted at the insertion point. The insertion point can be determined by comparing the PDU sequence number (or timestamp) in the current PDU descriptor with the PDU sequence numbers in the PDU descriptors of the PDU descriptor list. If the created PDU descriptor's PDU sequence number falls between the sequence number of two sequential PDU descriptors in the list, the created PDU descriptor is inserted between the two sequential PDU descriptors. To insert the created PDU descriptor, a reference to the created PDU descriptor is written into the first of the two sequential PDU descriptors (replacing a reference to the second of the two sequential PDU descriptors). A reference to the second of the two sequential PDU descriptors is also written into the created PDU descriptor. After the created PDU descriptor is inserted at the insertion point, the process ends.

The initial PDU descriptor list provides direct access to the PDUs written into the buffer pool and provides a base upon which other PDU descriptor lists can be constructed. A descriptor list for application protocol PDUs can be built directly upon the base PDU descriptor list as depicted in FIG. 1. In some embodiments, other additional levels of PDU descriptors lists can be constructed. As mentioned earlier, multiple application protocols can be stacked atop each other. Or PDU descriptor lists may be constructed for other layers of a network stack implemented on communicating devices. For example, the base layer PDU descriptor list can correspond to the network layer. Another PDU descriptor list for session layer protocol PDUs can be constructed that references the network layer protocol PDU descriptor list. An application layer protocol PDU descriptor list can be constructed that references the session layer protocol PDU descriptor list. In some cases, the PDU stream interface is configured or programmed to construct additional protocol PDU descriptor lists (e.g., PDU descriptor lists for other lower layer protocols or default application protocols). In some cases, the PDU stream interface constructs additional protocol PDU descriptor lists when requested.

Figure 3:
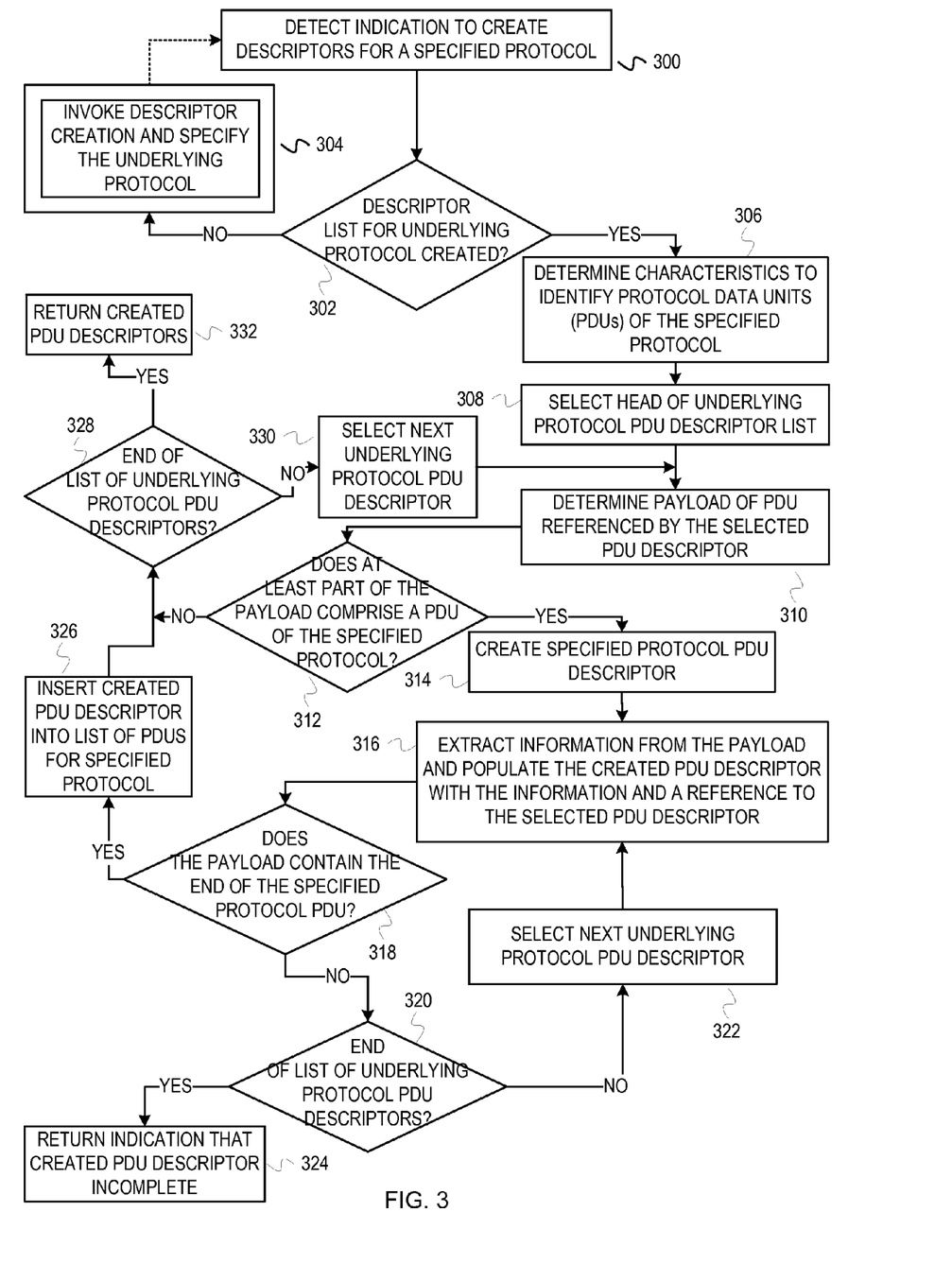
FIG. 3 depicts a flowchart of example operations for constructing a protocol data unit descriptor list on top of a base layer or other protocol descriptor list.

FIG. 3 depicts a flowchart of example operations for constructing a protocol data unit descriptor list on top of a base layer or other protocol descriptor list. In order to maintain a clear description, PDUs of the underlying protocol descriptor list will be referred to as packets, while PDUs associated with the protocol data unit descriptor list being constructed will be referred to as messages. The operations depicted in FIG. 3 and described below can be performed by the PDU stream interface 112 depicted in FIG. 1 but are not limited to the embodiments described above.

At block 300, an indication to create descriptors for a specified protocol is detected. For example, the descriptors for the specified protocol can be created when a PDU stream interface determines that a message is present in the payload of a packet. In other words, when a PDU descriptor for an underlying layer is created, the PDU stream interface can analyze the payload of the associated packet. The presence of a message in the payload of the packet can serve as an indication to create descriptors for the specified protocol. The indication to create descriptors for a specified protocol can also be received from another component, such as an application. For example, the application can request data associated with a particular message. Similarly, the process depicted in FIG. 3 can indicate that descriptors for the underlying protocol should be created, as described below. After the indication to create descriptors for the specified protocol is detected, control then flows to block 302.

At block 302, it is determined whether a descriptor list for the underlying protocol has been created. If the descriptor list for the underlying protocol has not been created, then control flows to block 304. If the descriptor list for the underlying protocol has been created, control then flows to block 306.

At block 304, the descriptor creation process depicted in FIG. 3 is invoked and the underlying protocol specified. In some cases, an indication to create descriptors for the specified protocol is detected at block 300 before the descriptors for the underlying protocol are created. Thus, it is indicated that the descriptors for the underlying protocol should be created, resulting in a recursive application of the operations depicted in FIG. 3. The underlying protocol can be specified dynamically or can be hard-coded into program code that performs the operations at block 304. After the descriptor creation process is invoked, control then flows back to block 300.

If it was determined at block 302 that the descriptor list for the underlying protocol has been created, control flowed to block 306. At block 306, characteristics used to identify messages in packets are determined. For example, the beginning of a message might be indicated by a particular sequence of bits, a particular delimiter, etc. After characteristics used to identify messages in packets are determined, control then flows to block 308.

At block 308, the head of the underlying protocol PDU descriptor list is selected, and control then flows to block 310.

At block 310, the payload of the PDU referenced by the selected PDU descriptor is determined. For example, the PDU descriptor may contain a reference to the buffer in which the packet is stored. The buffer reference typically points to the first memory address containing the packet. To determine the payload, the memory address can be incremented by the size of the packet header, thus resulting in a memory address that references the beginning of the payload. After the payload of the packet referenced by the selected PDU descriptor is determined, control then flows to block 312.

At block 312, it is determined whether the payload comprises at least part of a PDU of the specified protocol. Whether the payload comprises part of a specified protocol PDU, for instance a message, can be determined by analyzing the payload for the characteristics determined at block 306. For example, the payload can be searched for a particular sequence of bits or a delimiter that defines the beginning of a message. Further, a determination that the payload comprises at least part of a message can be made based on determinations made for previous messages. For example, the specified protocol definition can state that messages begin immediately after a preceding message. In such a case, if it was previously determined that the payload contains the end of a message, it can be determined that the payload contains the beginning of the next message. If it is determined that the payload comprises at least part of a PDU of the specified protocol, control then flows to block 314. If it is determined that the payload does not comprise at least part of a PDU of the specified protocol, control then flows to block 328.

At block 314, a PDU descriptor is created for the specified protocol PDU (or at least part of the specified protocol PDU) located in the payload. As described above, the PDU descriptor can take any one of a variety forms that accommodate the information to be extracted from the PDUs, such as an array, a struct, a class/object, etc. After the PDU descriptor is created, control then flows to block 316.

At block 316, information is extracted from the payload. The created PDU descriptor is populated with the extracted information and with a reference to the PDU descriptor associated with the underlying protocol PDU. For instance, program code implementing a PDU stream interface writes a reference to the packet PDU descriptor, a message sequence number, offset to the packet payload, and other metadata relating to the message. After the information is extracted from the payload and populated into the PDU descriptor, control then flows to block 318.

At block 318, it is determined whether the payload contains the end of the specified protocol PDU. The characteristics of the specified protocol PDU, for instance message characteristics, determined at block 306 can be used to determine whether the payload contains the end of the message. For example, the end of the message can be indicated by a particular sequence of bits or a particular delimiter, similar to the beginning of the message. The end of the message can also be determined implicitly based on a determination that the beginning of another message is located in the payload. Further, the message itself can specify the length of the message (in the header for example), or the protocol can define the message length(s). In cases in which the length of the message is known, whether the payload contains the end of the message can be determined by comparing the length of the message with the size of the payload. If it is determined that the payload does not contain the end of the specified protocol PDU, control then flows to block 320. If it is determined that the payload does contain the end of the specified protocol PDU, control then flows to block 326.

At block 320, it is determined whether the end of the list of underlying protocol PDU descriptors has been reached. For example, if the current packet PDU descriptor does not have a reference to a subsequent packet PDU descriptor, the end of the list has been reached. If it is determined that the end of the underlying protocol PDU descriptor list has not been reached, control then flows to block 322. If it is determined that the end of the underlying protocol PDU descriptor list has been reached, control then flows to block 324.

At block 322, the next underlying protocol PDU descriptor is selected. The next underlying protocol PDU descriptor is selected by referring to the reference for the next underlying protocol PDU descriptor instead of the current packet PDU descriptor. After the next packet PDU descriptor is selected, control then flows back to block 316.

Control flowed to block 324 if it was determined, at block 320, that the end of the underlying protocol PDU list was reached. At block 324, an indication that the created PDU descriptor is incomplete is returned. Thus, an entity that relies on the creation of the PDU descriptor is notified that the PDU descriptor is incomplete. For example, if an application requested data for a specific message, the indication notifies the application that not all packets containing the message data have been received. If the process depicted in FIG. 3 was invoked at block 304, the parent process is notified that all of the underlying protocol PDU descriptors have been created, allowing the parent process to continue creating the higher level PDU descriptors. After the indication that the created PDU descriptor is incomplete is returned, the process ends.

Control flowed to block 326 if it was determined, at block 318, that the payload contains the end of the specified protocol PDU. At block 326, the created PDU descriptor is inserted into a list of PDU descriptors for the specified protocol. In other words, the created PDU descriptor is inserted into a list of PDU descriptors that are associated with messages of the specified protocol. The created PDU descriptor can be inserted into the list as described above. After the created PDU descriptor is inserted into the list of PDU descriptors, control then flows to block 328.

At block 328, it is determined whether the end of the list of underlying protocol PDU descriptors has been reached. For example, if the current packet PDU descriptor does not have a reference to a subsequent packet PDU descriptor, the end of the list has been reached. If it is determined that the end of the packet PDU descriptor list has not been reached, control then flows to block 330. If it is determined that the end of the packet PDU descriptor list has been reached, control then flows to block 332.

At block 330, the next underlying protocol PDU descriptor is selected. The next underlying protocol PDU descriptor is selected by referring to the reference for the next underlying protocol PDU descriptor instead of the current underlying protocol PDU descriptor. After the next underlying protocol PDU descriptor is selected, control then flows back to block 332.

Control flowed to block 332 if it was determined, at block 328, that the end of the underlying protocol PDU descriptor list had been reached. At block 332, the created PDU descriptors are returned because all received underlying protocol PDUs have been analyzed for PDUs of the specified protocol. Because no more underlying protocol PDUs have been received, no more specified protocol PDU descriptors can be created. After the created PDU descriptors are returned, the process ends.

As described above, the application can request application message data using a variety of criteria. For example, the application might request application message data for the next application message with a specific command. Thus, in some implementations, the PDU stream interface might determine whether a found application message meets the specified criteria prior to creating the message descriptor. In some implementations, the PDU stream interface might create message descriptors for all application messages found. The PDU stream interface can then optionally delete message descriptors that do not meet the criteria of the request from the application.

A component that embodies the functionality described herein, such as a PDU stream interface, can be implemented in a modular, pipelined format. By separating various operations involved in abstracting the packet data into modules, the modules can be customized or switched out depending on the particular environment. If the operations of each module are independent of each other, the modules can be implemented using an Actor-Model methodology, allowing asynchronous communications between the components. If the operations of each module are independent of each other, the modules can be assigned independently to various processor cores, further increasing the potential performance of the system.

Figure 4:
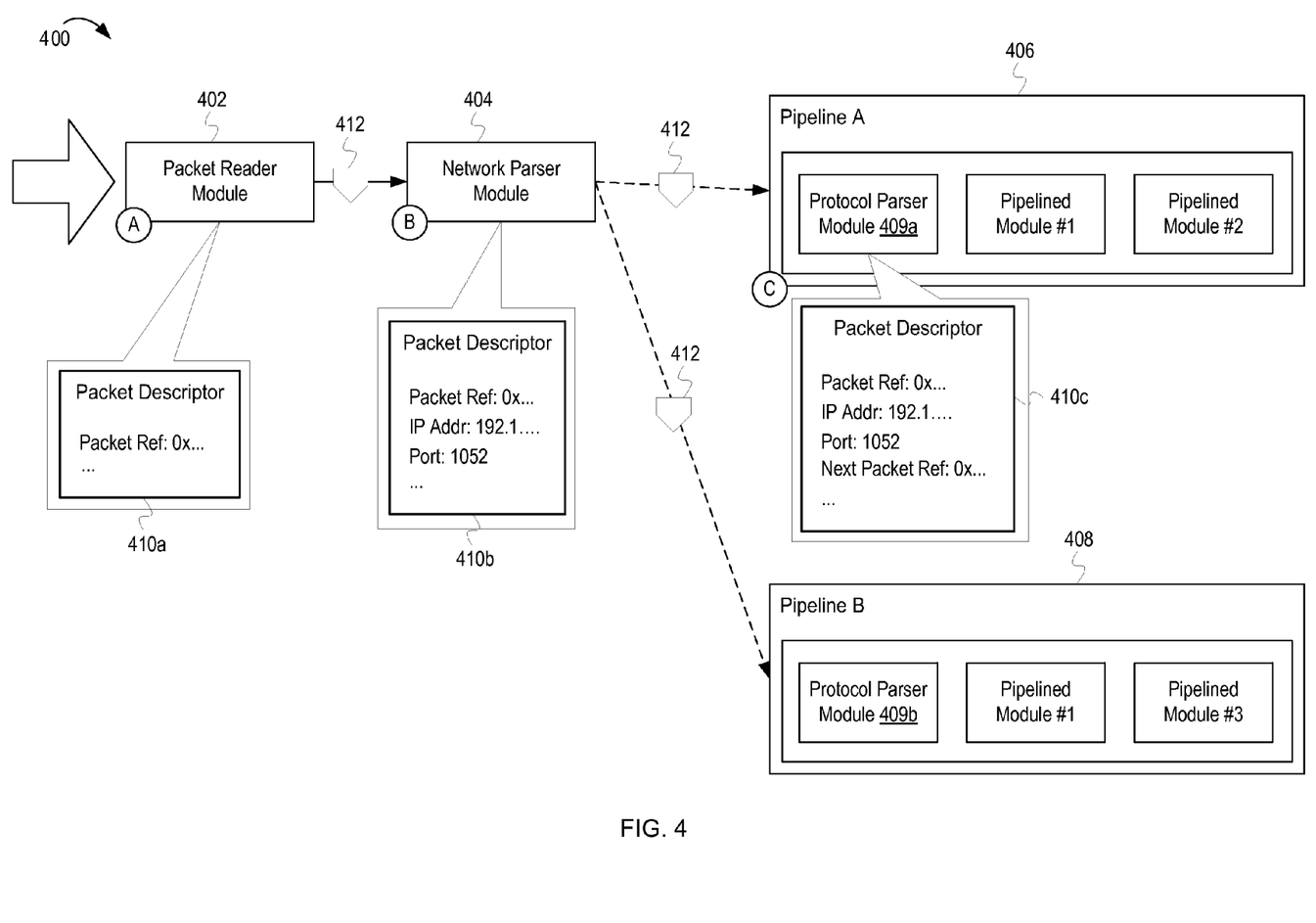
FIG. 4 depicts an example PDU stream interface at least partially embodied as pipelined modules.

FIG. 4 depicts an example PDU stream interface at least partially embodied as pipelined modules. FIG. 4 depicts a PDU stream interface 400 including a packet reader module 402, a network parser module 404, pipeline A 406, and pipeline B 408. Pipeline A 406 includes a protocol parser module 409a and pipeline B 408 includes a protocol parser 409b.

The packet reader module 402 monitors a buffer pool (not depicted) for new packets and sets up the initial packet descriptor data structures. Thus, at stage A, the packet reader module 402 determines that a new packet has been written into a buffer of the buffer pool. The packet reader module 402 creates a packet descriptor data structure and initializes a reference to the buffer (depicted by the first packet descriptor representation 410a). The packet reader module 402 then passes a packet descriptor reference 412 to the network parser module 404.

The network reader module 404 parses the packet data in the buffer referenced by the packet descriptor. Thus, at stage B, the network reader module 404 extracts a set of one or more network-related values from the packet data. For example, the network reader module 404 may determine the IP address and port number associated with the packet by extracting the data from the packet header. The network reader module 404 stores the network-related data in the packet descriptor (depicted by the second packet descriptor 410b). The network reader module 404 then determines which pipeline the packet descriptor reference 412 should be passed to. For example, the network reader module 404 might determine that all packets sent to a first port are to be processed by pipeline A 406 and all packets sent to a second port are to be processed by pipeline B 408. The network parser module 404 might be implemented to use any or all of the data available to determine which pipeline the packet descriptor reference 412 should be sent to.

The protocol parser modules 409a and 409b put the packet descriptors in the proper sequential order and perform other operations that are based on the protocol, such as building message descriptors. Thus, at stage C, the protocol parser module 409a stores a reference to packet descriptor associated with a packet that that is the next sequential packet (depicted by the third packet descriptor 410c). The protocol parser 409a might receive requests for application message data and create message descriptors in response to said receiving the requests for application message data.

Many different implementation variations are possible. For example, each NIC within a computer may have a separate packet reader 402 and/or network parser module 404. Multiple NICs within a computer may share the packet reader 402 and/or network parser module 404. One or more NICS within a computer may have multiple packet reader modules and/or network parser modules. The packet reader module 402 and/or network parser module 404 can be a part of a pipeline. Further, modules may share pipelines or have one or more dedicated pipelines.

Each pipeline may have a different purpose. For example, pipeline A 406 might be responsible for handling packets for protocol A, while pipeline B 408 is responsible for handling packets for protocol B. Thus, protocol parser module 409a may differ from protocol parser module 409b. Similarly, the pipelines may be responsible for handling packets from the same protocol but performing different operations on the packets. For example, protocol parser module 409a and protocol parser module 409b may function identically. However, pipeline A 406 might contain different modules after the protocol parser module stage than pipeline B 408.

Multiple protocol parser modules might be used. For example, some protocols are built upon other protocols, such as the Network File System (NFS) protocol being built on a Remote Procedure Call (RPC) protocol. A pipeline designed to perform operations on packets containing NFS data may include an RPC protocol parser module to parse the RPC-related data followed by an NFS protocol parser module to parse the NFS-related data. The particular responsibilities of the various protocol parser modules can vary depending on the specific protocols.

The specific implementations of the embodiments described herein and other variations of the described embodiments that are consistent with the descriptions herein can vary based on many factors, such as the implementations, features, and functionality of components with which the PDU stream interface interacts and the general environment. For example, a PDU stream interface cannot take advantage of being notified that new packet data has been written into a buffer unless another component is implemented such that it can provide the notification. Similarly, a PDU stream interface that is implemented specifically to interact with kernel modules might not implement an API that can interact with applications running in user space. However, even though these factors can impact specific implementations, the implementations are not generally limited by these factors. For example, even in a computer in which no component is capable of notifying a PDU stream interface that packet data has been written to a buffer pool, the PDU stream interface might prospectively implement functionality that is capable of receiving notifications should such functionality be implemented in the future.

As example flowcharts, FIGS. 2 and 3 present operations in an example order from which embodiments can deviate (e.g., operations can be performed in a different order than illustrated and/or in parallel). For example, additional operations may be performed between blocks 322 and 316 in the process depicted in FIG. 3 to determine whether the next underlying protocol payload is associated with the particular specified protocol PDU that is associated with the created PDU descriptor. Such a scenario might arise when the parts of the application message are not contained in contiguous packets.

The descriptions herein refer to one or more computers. A computer comprises any kind of computing system, machine, or device, including a personal computer, a laptop, a server, a tablet, a smartphone, a smartwatch, etc. A computer can also comprise a computing system that is communicatively coupled with other computer systems to form a set of computing systems that coordinate to perform functions similar to that of a single computing system. Further, a computer can comprise the aforementioned set of coordinated computing systems. In other words, where the descriptions herein refer to a computer, a distributed computing system, grid computing system, cloud computing system, etc. can be used.

The descriptions herein also refer to "applications", including interactions with "applications". The term "applications" as used herein includes any form of software, firmware, or combinations thereof that are capable of performing the operations described. For example, when a description refers to an application interacting with an Application Programming Interface (API), a hardware module programmed to interact with the API is an application. Additionally, an application can be, but is not always, a standalone application. For example, in the preceding example, the component implementing the API and the application interacting with the API can both be components of another application.

As will be appreciated by one skilled in the art, aspects of the inventive subject matter may be embodied as a system, method or computer program product. Accordingly, aspects of the inventive subject matter may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the inventive subject matter may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, a device or collection of devices that store program code/instructions by electronic means, magnetic means, optical means, electromagnetic means, infrared means, or any suitable combination of the foregoing. More specific examples (a non-exhaustive list) of the computer readable storage medium would include the following: a portable computer diskette, a hard disk, a random access memory (RAM), a read-only memory (ROM), an erasable programmable read-only memory (EPROM or Flash memory), a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with a computer. A computer readable storage medium does not comprise a transitory signal.

A computer readable signal medium may include a propagated data signal with computer readable program code embodied therein, for example, in baseband or as part of a carrier wave. Such a propagated signal may take any of a variety of forms, including, but not limited to, an electromagnetic signal, an optical signal, an infrared signal, or any suitable combination thereof. A computer readable signal medium may be any computer readable medium that is not a computer readable storage medium and that can communicate, propagate, or transport a program for use by or in connection with a computer. Program code embodied on a computer readable signal medium may be transmitted using any appropriate medium, including but not limited to wireless, wireline, optical fiber cable, RF, etc., or any suitable combination of the foregoing.

Computer program code for carrying out operations for aspects of the inventive subject matter may be written in any combination of one or more programming languages, including an object oriented programming language such as the Java® programming language, C++ or the like; a dynamic programming language such as Python; and conventional procedural programming languages, such as the "C" programming language or similar programming languages. The program code may execute entirely on a stand-alone computer, may execute in a distributed manner across multiple computers, and may execute on one computer while providing results and or accepting input on another computer.

Aspects of the inventive subject matter are described with reference to flowchart illustrations and/or block diagrams of methods, apparatus (systems) and computer program products according to embodiments of the inventive subject matter. It will be understood that each block of the flowchart illustrations and/or block diagrams, and combinations of blocks in the flowchart illustrations and/or block diagrams, can be implemented by computer program code/instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium to produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

Figure 5:
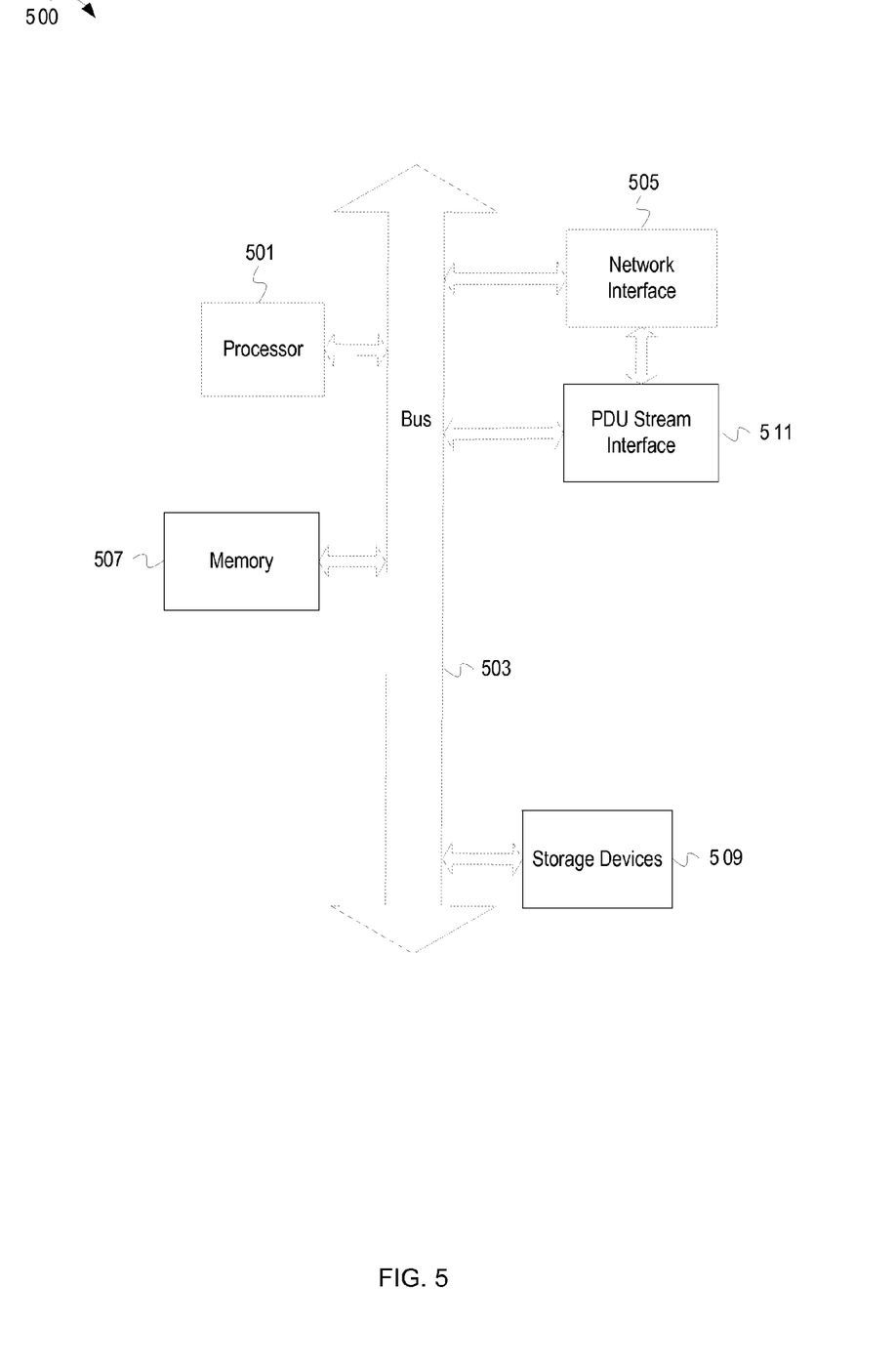
FIG. 5 depicts an example computer system that includes a protocol data unit stream interface.

FIG. 5 depicts an example computer system that includes a protocol data unit stream interface. A computer system 500 includes a processor 501 (possibly including multiple processors, multiple cores, multiple nodes, and/or implementing multi-threading, etc.). The computer system 500 includes memory 507. The memory 507 may be system memory (e.g., one or more of cache, SRAM, DRAM, zero capacitor RAM, Twin Transistor RAM, eDRAM, EDO RAM, DDR RAM, EEPROM, NRAM, RRAM, SONOS, PRAM, etc.) or any one or more of the above already described possible realizations of machine-readable media. The computer system 500 also includes a bus 503 (e.g., PCI, ISA, PCI-Express, HyperTransport® bus, InfiniBand® bus, NuBus, etc.), a network interface 505 (e.g., an ATM interface, an Ethernet interface, a Frame Relay interface, SONET interface, wireless interface, etc.), and a storage device(s) 509 (e.g., optical storage, magnetic storage, etc.). The computer system 500 also includes a PDU stream interface 511. The PDU stream interface 511 is depicted as being coupled with the network interface 505 and the bus 503. The coupling can be communicative or logical. The PDU stream interface 511 embodies functionality to implement embodiments described above. The PDU stream interface 511 may include one or more functionalities that facilitate providing a view to packets stored in non-contiguous memory locations simulating the view that an application-level program would see. Any one of these functionalities may be partially (or entirely) implemented in hardware and/or on the processor 501. For example, the functionality may be implemented with an application specific integrated circuit, in logic implemented in the processor 501, in a co-processor on a peripheral device or card, etc. Further, realizations may include fewer or additional components not illustrated in FIG. 5 (e.g., video cards, audio cards, additional network interfaces, peripheral devices, etc.). The processor 501, the storage device(s) 509, and the network interface 505 are coupled to the bus 503. Although illustrated as being coupled to the bus 503, the memory 507 may be coupled to the processor 501.

While the embodiments are described with reference to various implementations and exploitations, it will be understood that these embodiments are illustrative and that the scope of the inventive subject matter is not limited to them. In general, techniques for providing a coherent view of protocol data units written into a buffer pool as they are received as described herein may be implemented with facilities consistent with any hardware system or hardware systems. Many variations, modifications, additions, and improvements are possible.

Plural instances may be provided for components, operations or structures described herein as a single instance. Boundaries between various components, operations and data stores are somewhat arbitrary, and particular operations are illustrated in the context of specific illustrative configurations. Other allocations of functionality are envisioned and may fall within the scope of the inventive subject matter. In general, structures and functionality presented as separate components in the example illustrations may be implemented as a combined structure or component. Similarly, structures and functionality presented as a single component may be implemented as separate components. These and other variations, modifications, additions, and improvements may fall within the scope of the inventive subject matter.

What is claimed is:

1. A method for creating a hierarchy of descriptors for protocol data units of different protocols comprising:
    while protocol data units of a first protocol at a first layer of a network stack are received and written into a buffer pool, creating, at a first level of the hierarchy, a first protocol descriptor for each protocol data unit of the first protocol responsive to determining that the protocol data unit has been written into the buffer pool, wherein the first protocol descriptor is created with at least an indication of a memory location where the protocol data unit has been written within the buffer pool;
    maintaining an order for the first protocol descriptors in accordance with an order of the protocol data units as indicated by the protocol data units;
    creating, at a second level of the hierarchy, second protocol descriptors for protocol data units of a second protocol at a second layer of the network stack, wherein each of the second protocol descriptors is created with a reference to at least one of the first protocol descriptors, the first layer of the network stack differing from the second layer of the network stack; and
    providing access to payloads of the protocol data units of the first protocol in the buffer pool with the second protocol descriptors.

2. The method of claim 1 further comprising providing a coherent view of protocol data units of the second protocol with the second protocol descriptors.

3. The method of claim 1 further comprising reassembling the protocol data units of the second protocol via the second protocol descriptors and the first protocol descriptors.

4. The method of claim 1 further comprising detecting writing of each of the protocol data units of the first protocol into the buffer pool.

5. The method of claim 4, wherein said detecting writing of each of the protocol data units of the first protocol into the buffer pool comprises one of polling a component of a layer of an implemented network stack and receiving an interrupt message from the component of the layer of the implemented network stack.

6. The method of claim 1, wherein said maintaining the order for the first protocol descriptors in accordance with the order of protocol data units as indicated by the protocol data units comprises:
    for each of the protocol data units of the first protocol, examining a header of the protocol data unit for sequence information about the protocol data unit and creating the first protocol descriptor that references the protocol data unit in accordance with the sequence information with respect other first protocol descriptors.

7. The method of claim 1, wherein said creating the second protocol descriptors for the protocol data units of the second protocol comprises:
    accessing payloads of the protocol data units in the buffer pool via the first protocol descriptors; and
    identifying the protocol data units of the second protocol within the payloads.

8. The method of claim 7 further comprising determining a characteristic for identifying a protocol data unit of the second protocol prior to creating the second protocol descriptors, wherein said identifying the protocol data units of the second protocol within the payloads comprises examining each of the payloads for the characteristic.

9. A non-transitory computer readable storage medium having stored thereon computer executable program instructions for creating a hierarchy of descriptors for protocol data units of different protocols, the program instructions to:
    create, as a first level of the hierarchy, a first sequence of descriptors for a stream of protocol data units received by a component of a first protocol at a first layer of a network stack, the program instructions to create the first sequence of descriptors coincident with writing of the stream of protocol data units into a plurality of memory locations by the component of the first protocol;
    indicate, in each of the first sequence of descriptors, where the corresponding one of the protocol data units of the first protocol has been written into the plurality of memory locations;
    maintain the first sequence of descriptors in an order according to an order indicated by the protocol data units in the stream of protocol data units;
    access payloads of the stream of protocol data units via the first sequence of descriptors and determine data of the payloads that form protocol data units of a second protocol at a second layer of the network stack, the first layer of the network stack differing from the second layer of the network stack; and
    create, as a second level of the hierarchy, a second sequence of descriptors for the protocol data units of the second protocol, the program instructions to create each of the second sequence of descriptors with an indication of those of the first sequence of descriptors that indicate a protocol data unit with a payload that forms at least part of a corresponding one of the protocol data units of the second protocol represented by the descriptor of the second sequence of descriptors.

10. The non-transitory computer readable storage medium of claim 9, wherein the program instructions further comprise program instructions to indicate, in each of the first sequence of descriptors, information from a corresponding one of the stream of protocol data units.

11. The non-transitory computer readable storage medium of claim 9, wherein the program instructions further comprise program instructions to indicate, in each of the second sequence of descriptors, information from a corresponding one of the protocol data units of the second protocol.

12. The non-transitory computer readable storage medium of claim 9, wherein the program instructions to create the second sequence of descriptors for the protocol data units of the second protocol comprise program instructions to determine a characteristic of a beginning of a protocol data unit of the second protocol and to examine the payloads for the characteristic.

13. The non-transitory computer readable storage medium of claim 9 further comprising program instructions to determine the second protocol specified in a request and invoke the program instructions to create the second sequence of descriptors in response to determining the second protocol specified in the request.

* * * * *